(No Model.)
W. P. PHILLIPS.
SAFETY WATER GAGE.
No. 421,139. Patented Feb. 11, 1890.
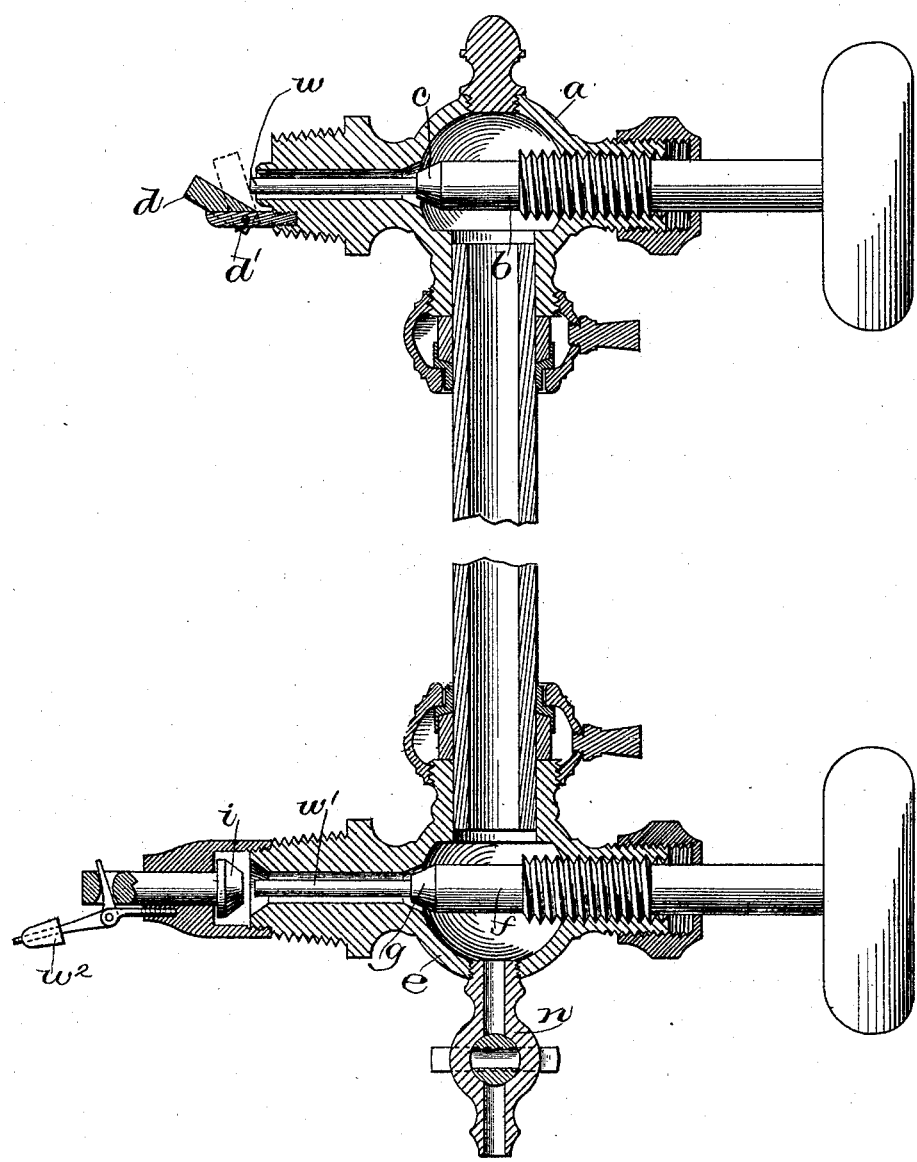
WITNESSES
INVENTOR
William P. Phillips,
by Crosby & Gregory
Attys.

United States Patent Office.

WILLIAM P. PHILLIPS, OF BOSTON, MASSACHUSETTS.

SAFETY WATER-GAGE.

SPECIFICATION forming part of Letters Patent No. 421,139, dated February 11, 1890.

Application filed September 2, 1889. Serial No. 322,650. (No model.)

*To all whom it may concern:*

Be it known that I, WILLIAM P. PHILLIPS, of Boston, county of Suffolk, State of Massachusetts, have invented an Improvement in Water-Gages, of which the following description, in connection with the accompanying drawing, is a specification, like letters on the drawings representing like parts.

This invention has for its object to construct an automatic water-gage for boilers, the valves of which will automatically close whenever the glass breaks, but which may be opened positively when desired, and also may be so set that they cannot close for the purpose of blowing out the gage.

In accordance with this invention the valves each comprise a valve-case having a hole or passage through it, a valve formed integral with or secured to a valve-stem to open and close said passage, and another valve arranged externally to the valve-case and acting as a check-valve to close the passage automatically whenever a glass breaks or to move toward its seat, but not seating, while blowing off.

The valve-stems are herein shown as provided with suitable extensions, so that when in certain positions the extensions will serve as stops for the check-valves for the purpose of preventing them closing against their seats to totally obstruct the passage, said extensions being also arranged to positively move the check-valves away from the seats when desired.

The figure shows in vertical section a water-gage embodying this invention.

The uppermost valve comprises a valve-case $a$, having a hole or passage through it, a valve-stem $b$ and a valve $c$, formed integral with or secured to said valve-stem. The valve-stem is turned by means of a hand-wheel attached to it in usual manner. The valve-stem has formed on or secured to it a suitable projection or extension $w$. A check-valve $d$, pivoted at $d'$ to a pin secured to the valve-case $a$, is designed to close against the end of the valve-case, closing the passage through it when pressure is brought upon it, and to fall away by gravity when pressure is released or equalized. The extension $w$ of the valve-stem, when the latter is turned into other than its complete withdrawn position, protrudes more or less from the seat of the check-valve, and thereby serves as a stop or abutment for said check-valve when in such position.

The lowermost valve of the gage comprises a valve-case $e$, having a hole or passage through it, a valve-stem $f$, and a valve $g$, formed integral with or secured to said valve-stem. The valve-stem is turned by a hand-wheel secured to it in any usual manner. A check-valve $i$, sliding horizontally in suitable bearings secured to the valve-case, is designed to close against the end of the valve-stem or an extension of it, closing the passage through it when pressure is brought upon it, and to fall away by means of a weight $w^2$, or it may be by gravity or otherwise when the pressure is released or equalized. An extension or bar $w'$ is formed upon or secured to the valve-stem $f$, which, when the latter is in certain positions, protrudes from the seat of the check-valve, serving as a stop or abutment for said valve when in such positions. A blow-off cock $n$ of usual construction is secured to the valve-case $e$.

With the parts in normal position, the valve-stems $b$ and $f$ will be completely or entirely withdrawn, and at such times the check-valves $d$ and $i$ will remain away from their seats; but if a glass breaks the pressure or current will cause them both to close on their seats automatically.

When a new tube is to be inserted, the check-valves are opened by means of the valve-stems $b$ and $f$, which are turned to positively move them away from their seats at the same time the valves $c$ and $g$ are closed, and after said tube is inserted by withdrawing said valve-stems the check-valves are left in their normal positions.

To blow through the gage, the valve-stems are turned, as shown in the drawing, so that the extensions $w$ $w'$ protrude from the seats of the check-valves, and thereby serve as stops or abutments therefor, and by opening the blow-off cock the pressure on the check-valves will close them against the ends of the said extensions; but at such time a free passage through the valve-case is formed.

I claim—

In a water-gage, a valve-case having a passage through it and a valve and valve-stem for the control of the said passage, combined with an external normally-open pivoted or hinged gravity-actuated valve for automatically closing the said passage upon decrease of pressure at its inner side, the said pivoted or hinged valve being limited in its movement by the said valve or valve-stem, substantially as described.

In testimony whereof I have signed my name to this specification in the presence of two subscribing witnesses.

WILLIAM P. PHILLIPS.

Witnesses:
BERNICE J. NOYES,
E. J. BENNETT.